United States Patent [19]

Aizawa

[11] Patent Number: 4,849,956
[45] Date of Patent: Jul. 18, 1989

[54] INFORMATION RECORDING AND REPRODUCING APPARATUS

[75] Inventor: Takayuki Aizawa, Yokohama, Japan

[73] Assignee: Canon Kabushiki Kaisha, Tokyo, Japan

[21] Appl. No.: 914,193

[22] Filed: Oct. 1, 1986

[30] Foreign Application Priority Data

| Oct. 3, 1985 | [JP] | Japan | 60-219092 |
| Dec. 17, 1985 | [JP] | Japan | 60-283828 |
| Dec. 25, 1985 | [JP] | Japan | 60-296415 |

[51] Int. Cl.⁴ ............ G11B 5/09; G11C 29/00; G11C 13/04
[52] U.S. Cl. .................................... 369/58; 365/200
[58] Field of Search ............ 369/54, 58, 47, 48, 369/57; 365/260

[56] References Cited

U.S. PATENT DOCUMENTS

| 4,145,758 | 3/1979 | Drexlex et al. | 365/260 |
| 4,405,952 | 9/1983 | Slakmon | 360/49 |
| 4,420,807 | 12/1983 | Nolta et al. | 365/260 |
| 4,558,446 | 12/1985 | Banba et al. | 371/10 |
| 4,631,723 | 12/1986 | Rathbun et al. | 360/47 |

FOREIGN PATENT DOCUMENTS

| 83349162 | 2/1984 | Fed. Rep. of Germany . | |
| 2426938 | 12/1979 | France . | |
| 57-135410 | 8/1982 | Japan | 369/47 |
| 35733 | 3/1983 | Japan | 369/44 |
| 58-112154 | 4/1983 | Japan . | |
| 98806 | 6/1983 | Japan | 360/53 |
| 58-194143 | 12/1983 | Japan . | |
| 59-38930 | 3/1984 | Japan . | |
| 59-79406 | 8/1984 | Japan . | |
| 463803 | 11/1968 | Switzerland . | |
| 2022298 | 12/1979 | United Kingdom | 360/48 |

OTHER PUBLICATIONS

IBM Technical Disclosure, Defect Skipping Among fixed Length Records In Direct Access Storage Doherman, 9/76, vol. 19, No. 4, pp. 1424–1426.

Primary Examiner—Steven L. Stephan
Attorney, Agent, or Firm—Fitzpatrick, Cella, Harper & Scinto

[57] ABSTRACT

A relay recording area is used in an information recording and reproducing apparatus for storing recording information or recorded information if a defective track or sector is found in a recording medium during data recording or reproduction. An information recording apparatus includes: an information recording medium divided into a plurality of recording areas; a record unit for recording information on the recording medium; a memory for storing information to be recorded on a first recording area of the recording medium when the information cannot be recorded on the first recording area; and a controller for controlling the record unit to record the information stored in the memory on a second recording area different from the first recording area.

14 Claims, 13 Drawing Sheets

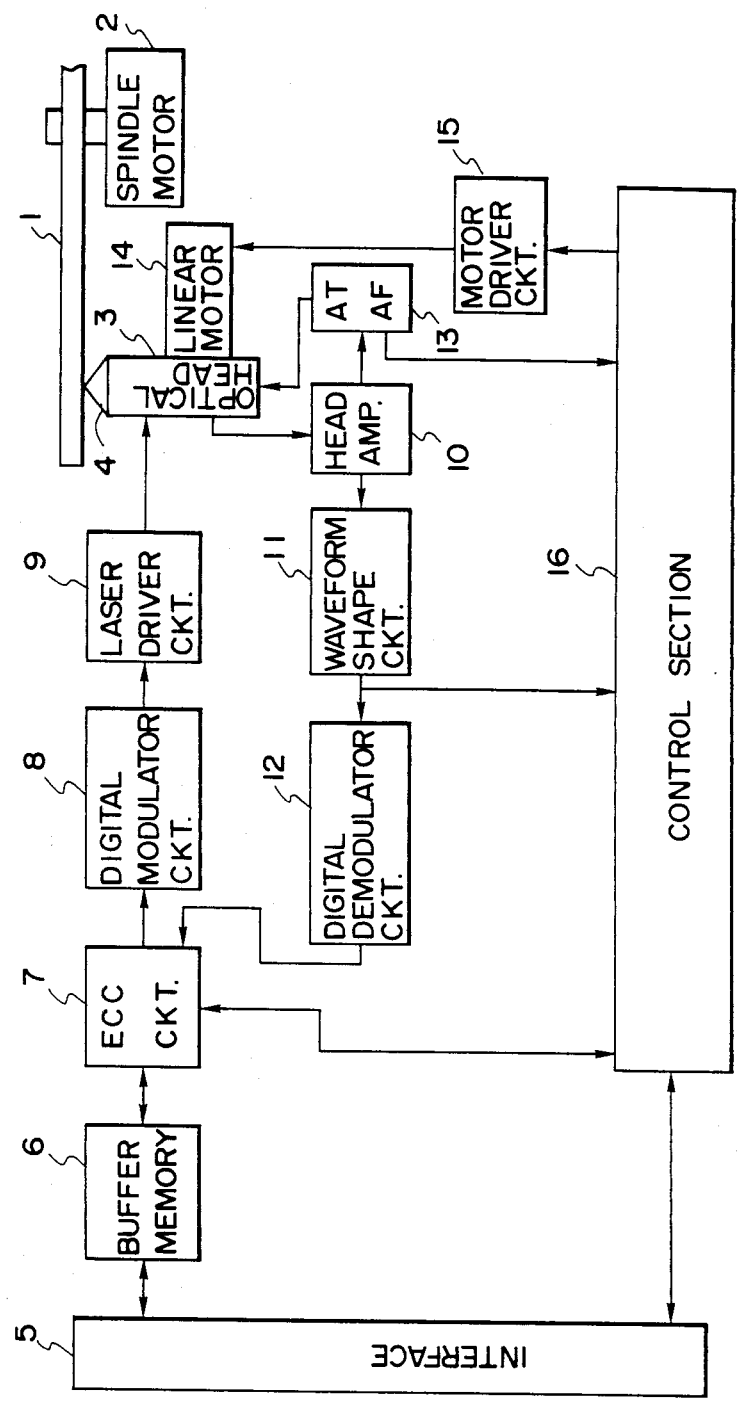

4,849,956

INFORMATION RECORDING AND REPRODUCING APPARATUS

BACKGROUND OF THE INVENTION

1. Field of the Invention

The present invention relates to an apparatus for recording/reproducing information on or from a recording medium.

2. Related Art

Information recording and reproducing devices include a magnetic disk apparatus, an optical disk apparatus, an opto-magnetic disk apparatus, an optical card apparatus, an ID card apparatus, and so on.

FIGS. 1(A) and 1(B) schematically illustrate the configuration of information recording tracks of an optical disk, and FIG. 1(C) shows the format of.

The optical disk 1 shown in FIG. 1(A) has concentric tracks, while the optical disk 1 shown in FIG. 1(B) has spiral tracks. Both optical disks 1 have a relay track region which is used as a substitute track when recording on some recording area is not possible.

Each track is constructed of, as shown in FIG. 1(C), an ID area for storing in most cases a track number, and a DATA area for storing data. An optical head can be accessed to a desired track after reading the ID area.

However, in case information must be recorded on a relay track, it takes additional time for the system to perform such recording, thus reducing the recording speed of the entire system.

SUMMARY OF THE INVENTION

It is an object of the present invention to eliminate the above disadvantages.

It is another object of the present invention to improve an information recording and reproducing apparatus.

It is a further object of the present invention to provide an information recording apparatus capable of reducing the number of accesses to relay recording areas and capable of attaining a high speed recording and a high speed information transfer, by storing information to be recorded on relay recording areas.

It is a still further object of the present invention to provide an information reproducing apparatus capable of reducing the number of accesses to relay recording areas and capable of attaining a high speed recording and a high speed information transfer, by storing information to be recorded on relay recording areas.

Other objects of the present invention will become apparent from the following description in connection with the accompanying drawings and the appended claims.

BRIEF DESCRIPTION OF THE DRAWINGS

FIG. 2 is a block diagram of an optical disk apparatus;

DETAILED DESCRIPTION OF THE PREFERRED EMBODIMENTS

Figure 1A:
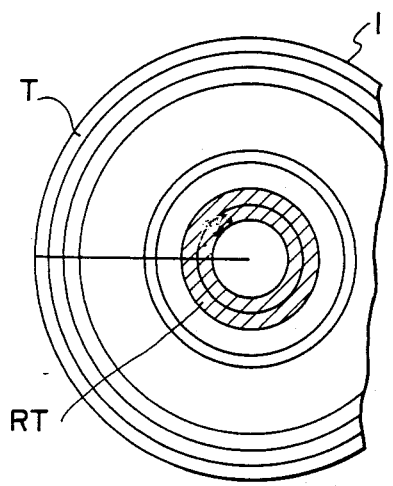
FIGS. 1(A) and 1(B) schematically show the configuration of tracks of an optical disk.
Figure 1B:
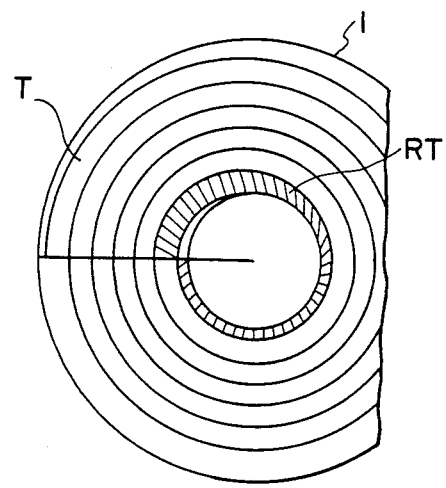
Figure 1C:
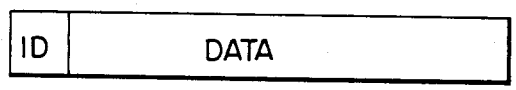
FIG. 1(C) is a view illustrating a format of a track.
Figure 3:
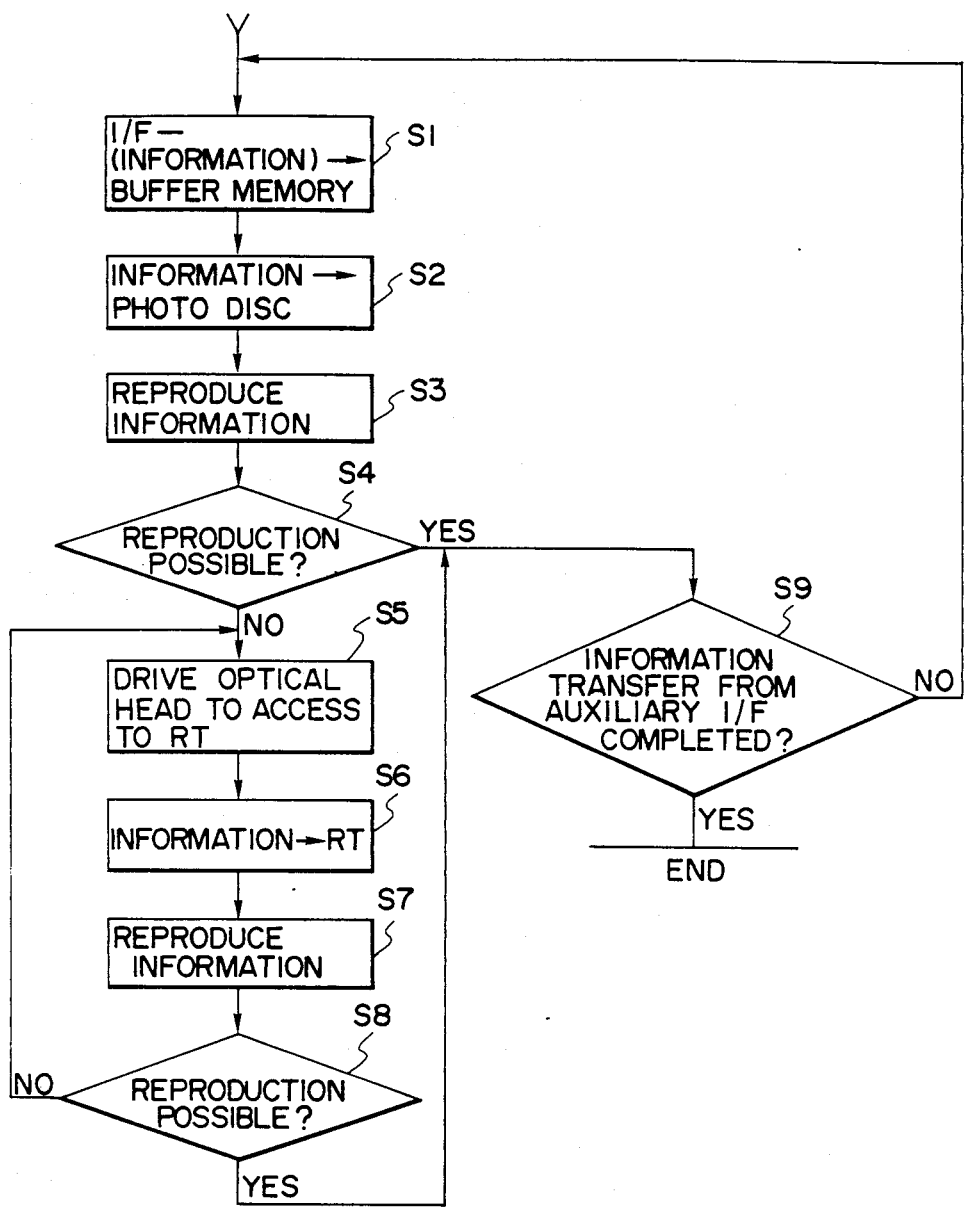
FIG. 3 is a flow chart for explaining the operation of the apparatus of FIG. 2.

FIG. 2 is a block diagram showing the construction of an optical disk apparatus, and FIG. 3 is a flow chart for explaining the operation of the apparatus.

Referring to FIG. 2, an optical disk 1 is rotated by a spindle motor 2. Information is recorded by a light beam 4 from an optical head 3. Reflected light by the optical disk 1 is received by the optical head 3 to reproduce the information, and control the focus of the light beam and the tracking.

The tracking control and the focus control are achieved by an AT-AF (Auto Tracking-Auto Focussing) circuit 13. The optical head 3 is movable in the radial direction of the optical disk by a linear motor 14 which is controlled by a control section 16 via a motor driver circuit 15 to make the optical head 3 access to a desired track.

An example of the operation of information recording on a desired track T of the photo disk or optical disk 1, will be described with reference to FIG. 3.

First, information is stored in a buffer memory 6 having a capacity of more than one track via an unrepresented external device (host computer or the like) and an interface 5 (step S1). The optical head 3 is accessed to a track T on which the information is recorded. The information stored in the buffer memory 6 is error-correction encoded by an ECC (Error-Correcting Code) circuit 7, and modulated by a digital modulator circuit 8 into a predetermined form. A laser driver circuit 9 drives a laser oscillator of the optical head 3 in accordance with the modulated information. to generate a light beam and record the information on the track T of the optical head 1 in the form of a series of bits (step S2).

After recording the information on the track T, the information just recorded on the track T is reproduced by the optical head 3 in order to check if the information has correctly been recorded or not (step S3). In particular, signals read by the optical head 3 are amplified by a head amplifier 10 and thereafter, demodulated by a waveform shape circuit 11 and a digital demodulator circuit 12 and inputted to the ECC circuit 7.

The ECC circuit 7 decodes the reproduced error-correction encoded information and checks if the reproduced information has an error or not (step S4). If no error, it is judged if the next information exists (step S9). Or if an error of the information is detected and an error correction is possible, the corrected information is again recorded on the track T by executing the operations of steps S3 and S4. Thereafter, it is checked if the next information exists (step S9). If present (if NO at step S9), steps S1 to S4 are repeated until the information transfer is completed.

If an error is present and an error correction is not possible at step S4 (if NO at step S4), the optical head 3 is accessed to a relay track RT (step S5) to again record the same information on the relay track RT (step S6). After the information has been recorded on the relay track RT, the information is reproduced from the relay track (step S7) to check if the information has been recorded correctly using the ECC circuit 7 (step S8).

If an error is detected by the ECC circuit (if NO at step S8), steps S5 to S8 are repeated as many times as the number of error correcting processings previously determined.

However, if the track T is to be decided defective at step S4, it is necessary to make the optical head access to the relay track RT from the track T, and to make the optical head return to the next track after the information has been recorded on the relay track RT. During this operation, recording operation cannot be performed. As a result, it is understood that unnecessary time is taken for the relay track processing, which reduces a recording speed of the entire system. Specifically, in the recording operation of color image information whose quantity is as large as several M bytes to several tens of M bytes, the relay track processing is probably performed several times. Therefore, it is understood that each time the relay track processing is performed, the optical head must be accessed to the relay track, which reduces a recording speed of the entire system.

Next, an embodiment, which is realized by further developing the above embodiment, will be described in connection with the block diagram of FIG. 4, wherein identical elements to those in FIG. 2 are represented by the same reference numerals and the description therefor is omitted.

Figure 4:
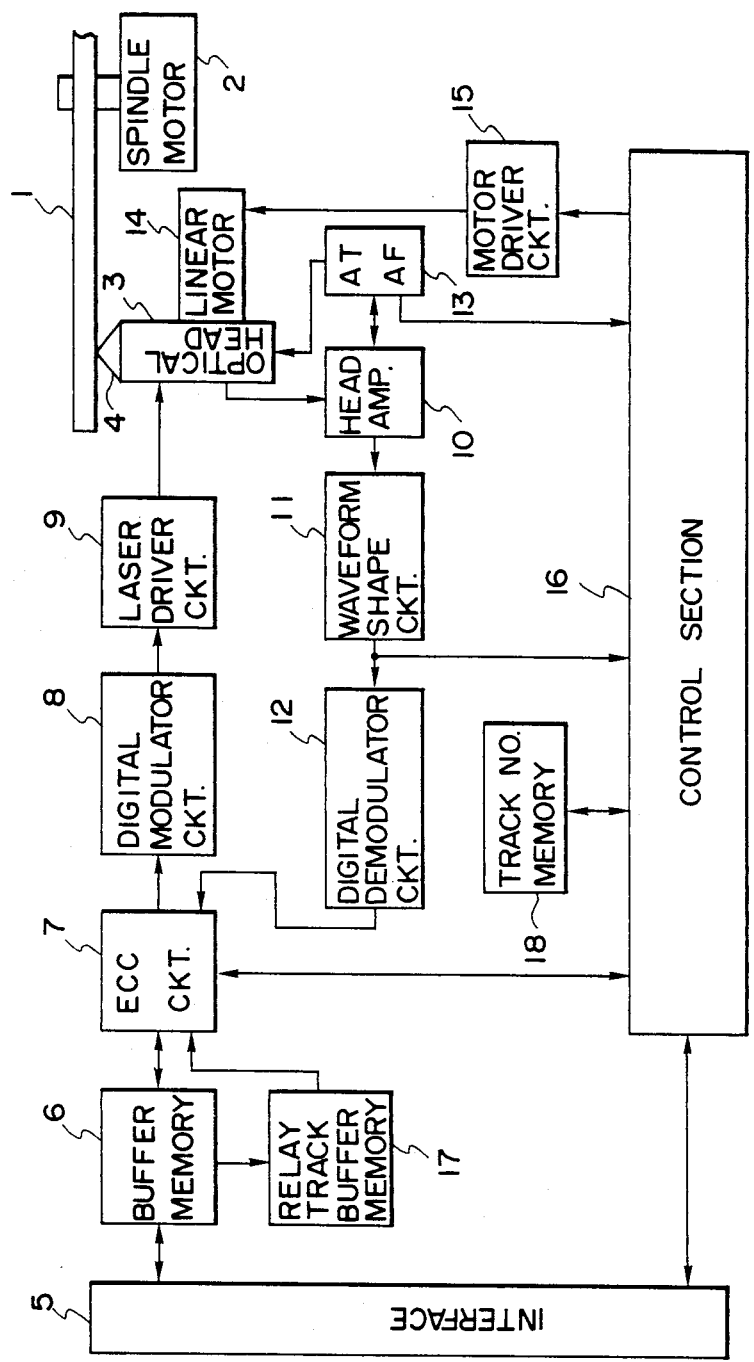
FIG. 4 is a block diagram showing an embodiment of an information recording and reproducing apparatus according to the present invention.

Referring to FIG. 4, a buffer memory 17 (hereinafter referred to as RT memory) for relay tracks, which memory has a capacity more than of the relay tracks, is connected to the buffer memory 6 storing information transferred from the external device via the interface 5. The output terminal of the RT memory 17 is connected to the ECC circuit 7.

The information stored in the buffer memory 6 is error-correction encoded by the ECC circuit 7, and passes the digital modulator circuit 8 and the laser driver circuit 8 to be recorded on the optical disk 1 by the optical head 3. The recorded information is read by the optical head 3 and inputted to the ECC circuit 7 via the head amplifier 10, waveform shape circuit 11, and digital demodulator circuit 12 for checking the read-out information. The check result is outputted to the control section 16 and subject to an error correction processing control to be described later.

To the control section 16, is connected a track number memory 18 (hereinafter referred to as TN memory) which stores the numbers of defective tracks judged that the information thereof cannot be error-corrected under the error correction processing control.

The operation of the relay track processing according to this embodiment will be described with reference to FIG. 5 which is a flow chart illustrating the operation of the embodiment.

Figure 5:
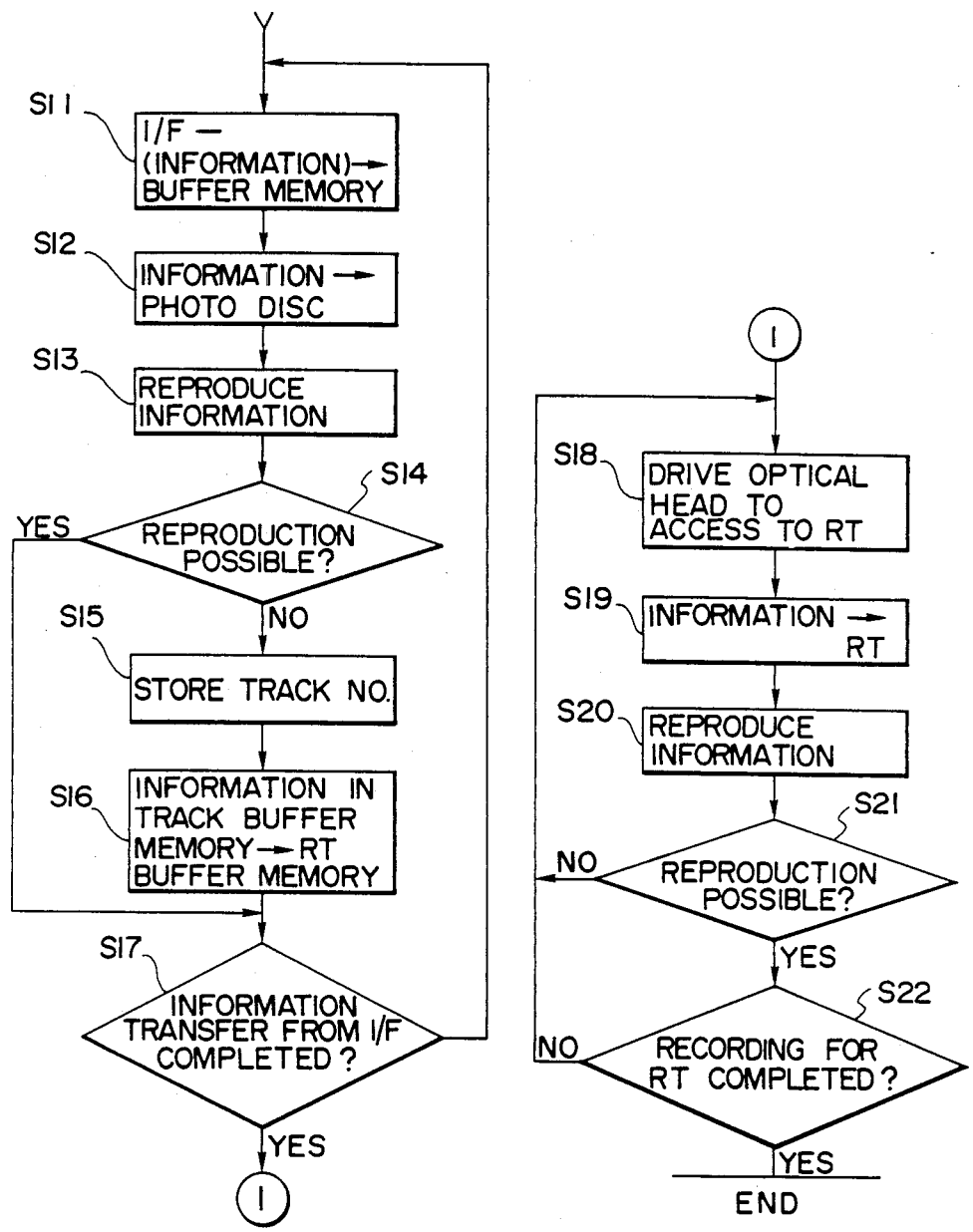
FIG. 5 is a flow chart for illustrating the operation of the embodiment.

In FIG. 5, the operations performed when the recorded information is reproduced correctly are the same as those in FIG. 3 and performed by steps S11 to S14 and S17. The operations to be performed when the error correction is impossible, will be described.

First, information is transferred from the external device via the interface 5 and stored in the buffer memory 6. Then, the control section 16 outputs a control signal to the motor driver circuit 15 based on readout signals and the like from the AF-AT circuit 13 and the waveform shape circuit 11, to thereby drive the linear motor 14 and make the optical head 3 access to a proper track. After recording the information on the track, it is reproduced from the track for checking it (steps S11 to S13).

If the error correction of the reproduced information is not possible and if the track is judged defective (if NO at step S14), the control section 16 instructs to store the track number recorded on the ID area of the defective track into the YN memory 18 (step S15), and transfer the information stored in the buffer memory to the RT memory 17 (step S16). The above operations (steps S11 to S17) are repeated until the information transfer is completed. Thus, all information transferred from the external device is either stored correctly on the track of the optical disk 1, or stored in the RT memory 17 in case of defective tracks.

After the information transfer from the interface 5 is completed (if YES at step 17), an operation starts which records the information stored in the RT memory 17 on relay tracks.

First, the control section 16 makes the linear motor operate and the optical head 3 access to the relay track (step S18). Succeedingly, the information stored in the RT memory 17 and the defective track numbers stored in the NT memory 18 are read. The information is encoded by the ECC circuit 7 and passes the digital modulator circuit 8 and the laser driver circuit 9 to be recorded on the relay tracks, one track after another, by the optical head 3 (step S19).

The information recorded on the relay tracks is read by the optical head 3, and via the head amplifier 10, waveform shape circuit 11 and digital demodulator circuit 12, is inputted to the ECC circuit 7 for checking it (steps 20 and 21).

The ECC circuit 7 checks the reproduced information and outputs a signal indicative of the presence of error to the control section 16. In case an error is detected (if NO at step S21), the control section 16 repeats the operations of steps S18 to S20 as many times as the number of error correction processings previously determined.

If the information has been recorded on the relay track correctly (if YES at step S21), the control section 16 judges if information still not recorded is present in the RT memory 17 (step S22). If there remains information (if NO at step S22), the operations following step S18 is performed in the similar manner as above. The recording operation is completed when all information stored in the RT memory 17 has been recorded correctly on the relay tracks (if YES at step S22).

As appreciated from the above embodiment, provisions of the RT memory 17 having a sufficient capacity enables a single access to relay tracks during recording operation.

In the above embodiment, although an optical disk 1 is used as an information recording medium, the invention is not limited thereto, but any other recording mediums may be used such as a magnetic disk, and an opto-magnetic optical card if only they have relay tracks.

The operations described above are applicable not only to track recording but also to sector recording. The error correction processing in units of sectors will now be described.

Figure 6:
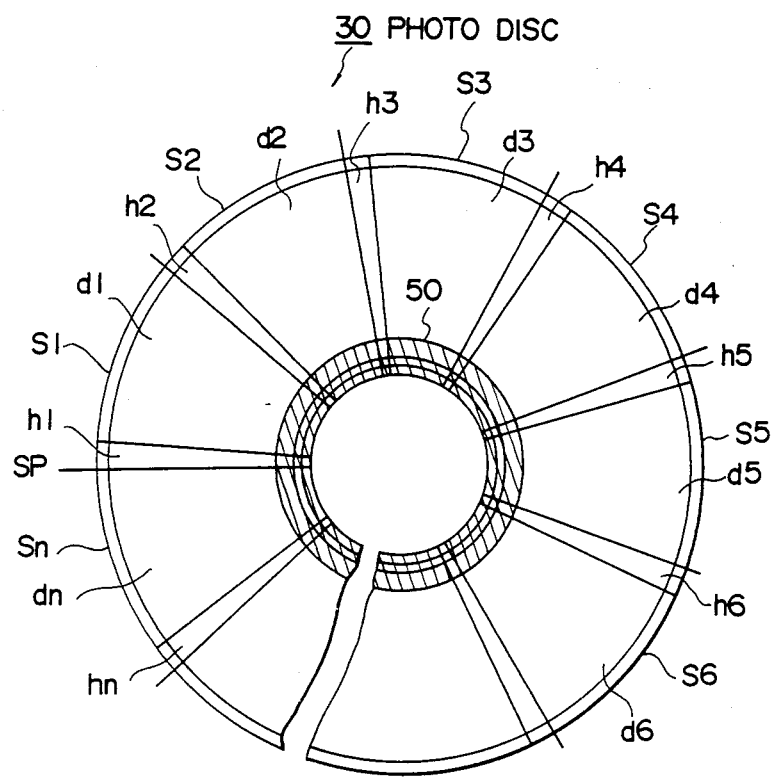
FIG. 6 illustrates an optical disk.

FIG. 6 is a plan view showing a disk type information recording medium such as a photo disk or an optical disk.

An optical disk 30 is constructed of a track start position SP, sectors s1 to sn, headers h1 to hn recorded with an address of sector and the like, data areas d1 to dn for recording data, and a relay sector section 50.

Each of the sectors d1 to dn is formed on concentric tracks. The relay sectors 50 depicted by oblique lines are used for defective sectors. Tracks in a spiral shape may be used.

Figure 7:
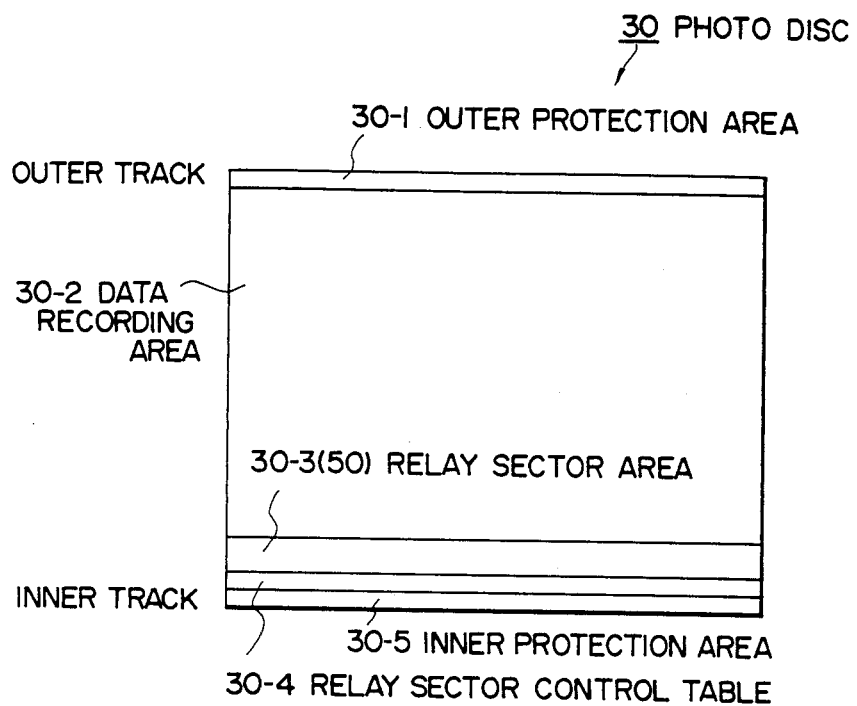
FIG. 7 is a memory map of an optical disk memory.

FIG. 7 is a memory map of the optical disk which map is composed of outer and inner protection areas 30-1 and 30-5, data recording area 30-2, relay sector areas 30-3 (50), and relay sector control table 30-4.

Figure 8:
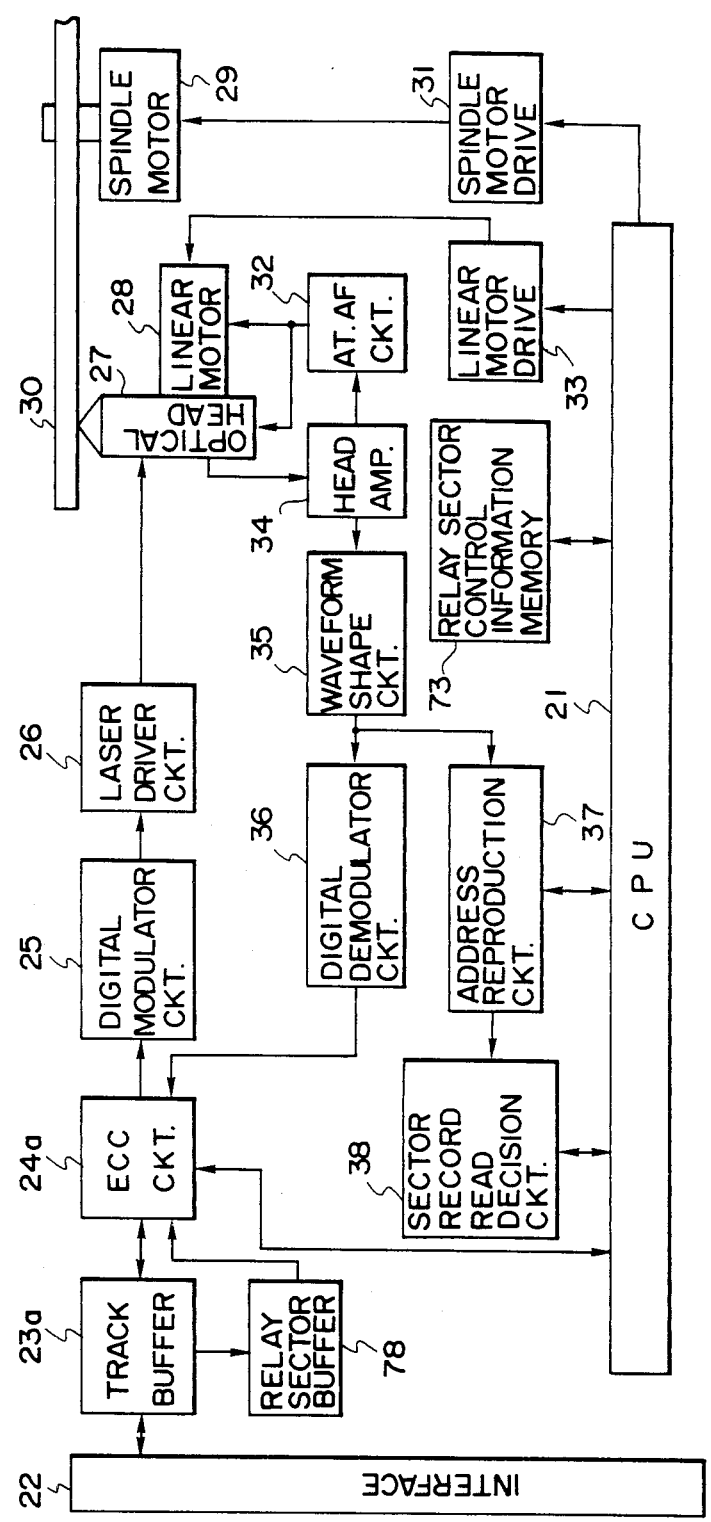
FIG. 8 is a block diagram of another embodiment of an information recording and reproducing apparatus according to the present invention.

FIG. 8 is a block diagram showing the construction of an information recording and reproducing apparatus according to another embodiment of the present invention.

Figure 9:
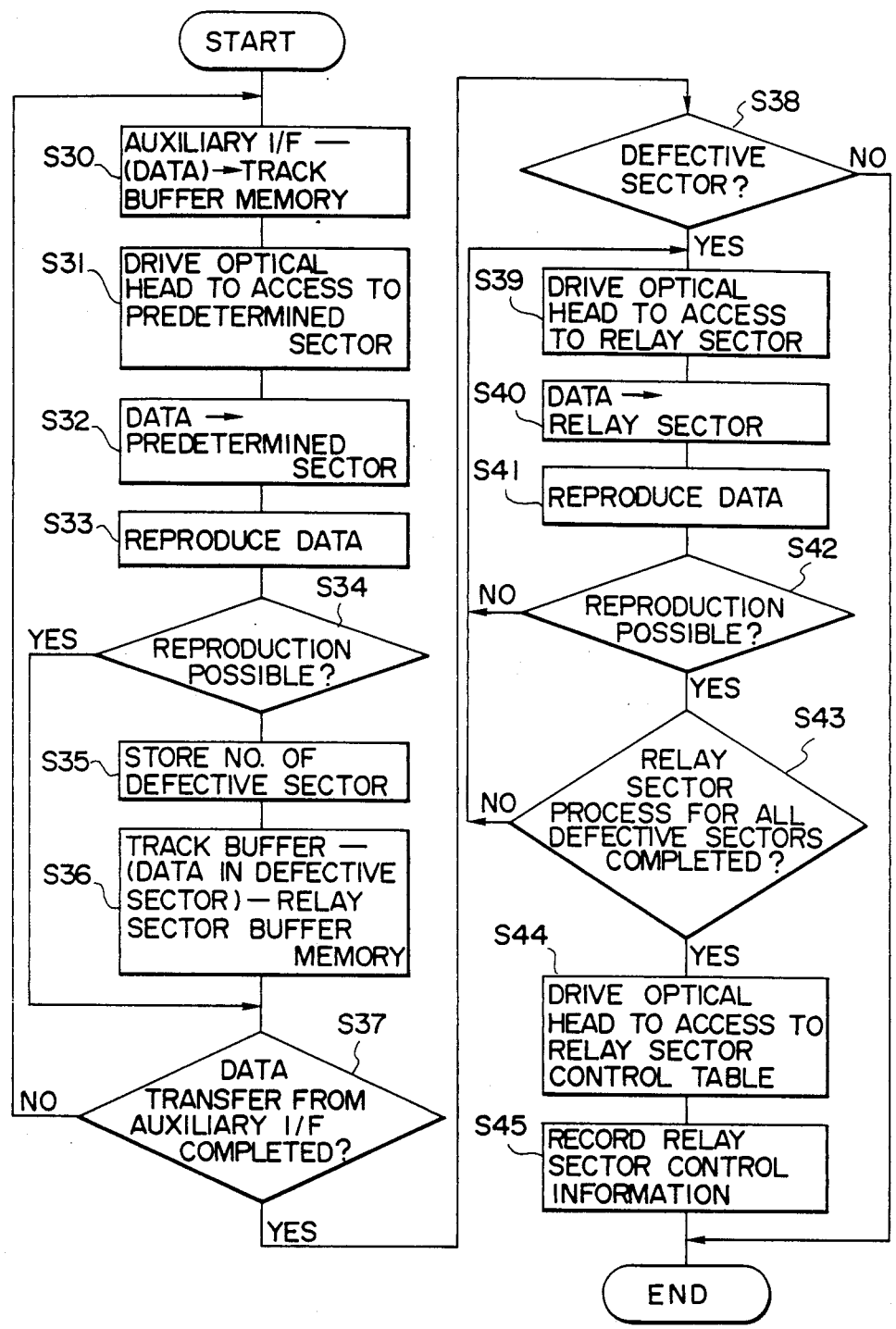
FIG. 9 is a flow chart for explaining the operation of the embodiment shown in FIG. 8.

The operation of the embodiment will be described. FIG. 9 is a flow chart illustrating the operation of the embodiment.

Data transferred via an auxiliary interface 22 is temporarily stored in a track buffer memory 23a which can store one track information (step S30).

When the optical head 27 is accessed to a proper position (a first sector for starting data recording) in response to a command from CPU 21 (step S31), the data stored in the track buffer 23a is error-correction encoded by the ECC circuit 24a, and via the digital modulator circuit 25 and laser driver circuit 26, sequentially recorded on corresponding sectors of the optical disk 30 (steps S32).

After the data is recorded on the optical disk 30, CPU 21 instructs to reproduce the recorded data so as to judge if the data has been recorded correctly (step S33). The data recorded on the optical disk 30 is error-correction decoded by the ECC circuit 24a after passing the head amplifier 34, waveform shape circuit 35 and digital demodulator circuit 36, to thereby check if data reproducing is possible or not. If the data recorded on the optical disk 30 can be reproduced (step S34), data transferred from the auxiliary interface 22 is stored in the track buffer 23a to record it on the optical disk.

If the recorded data cannot be reproduced (step S34), CPU 21 judges the sector recording data which cannot be reproduced, as a defective sector, and instructs to store the defective sector number in a relay sector control information memory 73 (step S35). The data recorded on the defective data and stored in the track buffer 23a is transferred to a relay sector buffer 78 (step S36).

After the data stored in the track buffer 23a is transferred to the relay sector buffer 78, next data from the auxiliary interface 21 is stored in the track buffer 23a and recorded on the optical disk 30. The above operations are repeated until data transferred from the auxiliary interface 22 stops (step S37).

After the data transferred from the auxiliary interface 22 stops, if a defective sector exists, i.e., if a defective sector number is stored in the relay sector control information memory 73 (step S38), then the optical head 27 is accessed to the relay sector area 30-3 (step S39) to record the data stored in the relay sector buffer 78 on a corresponding relay sector (steps S40 to S43). After the data is recorded on the relay sector, the optical head 27 is accessed to the relay sector control table 30-4 (step S44) to record the relay sector control information on the table 304 (step S45).

As seen from the above embodiment, after data from the auxiliary interface 22 stops, the number of accesses of the optical head 27 to the relay sector area 13 is only one. Therefore, data transfer rate is substantially improved.

In the above embodiment, although an optical disk apparatus has been used, the present invention is also applicable to other information recording and reproducing apparatus using other information recording mediums such as a magnetic disk, opto-magnetic disk, or optical card.

In the above embodiments, the information recording operation has been described. Next, an example of the information reproducing operation will be described.

Figure 10:
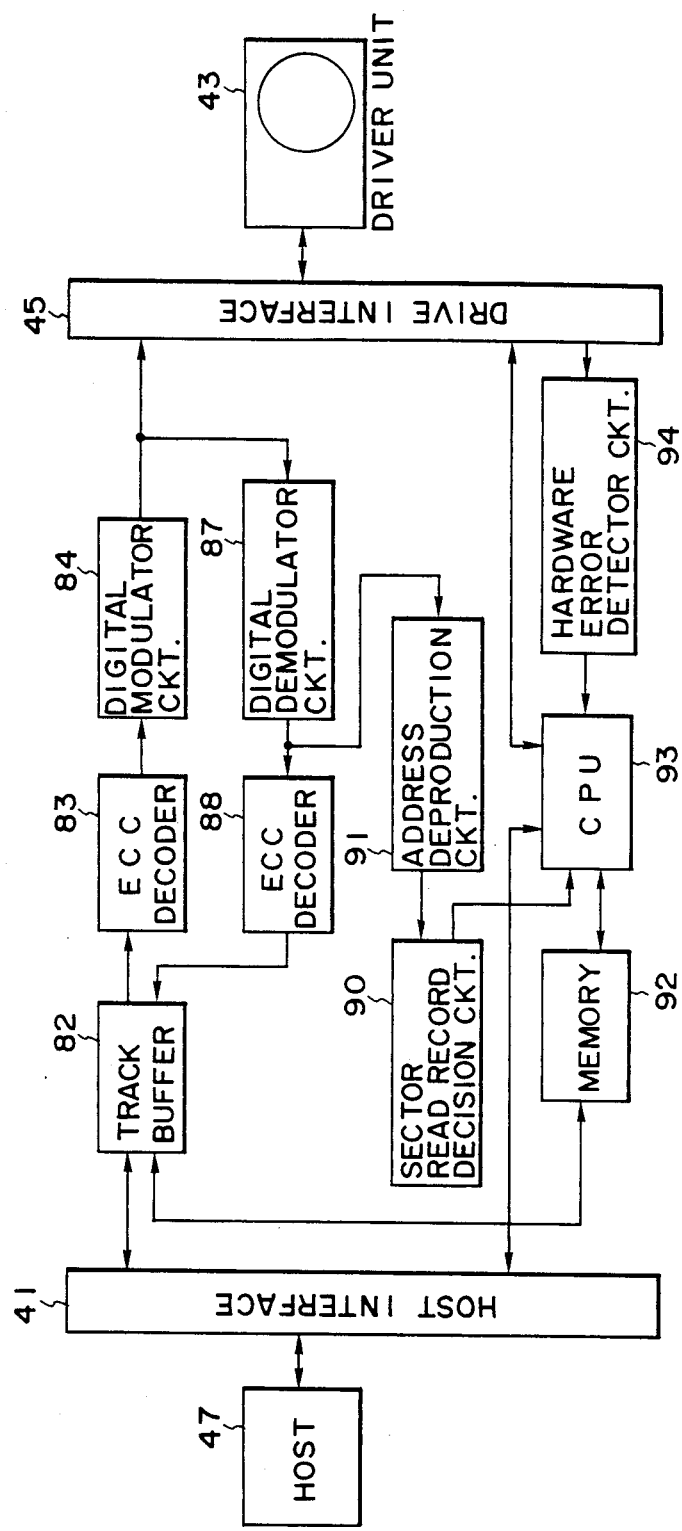
FIG. 10 is a block diagram of a controller of an information reproducing apparatus.

FIG. 10 is a block diagram showing an information reproducing apparatus, particularly a control device for an optical disk apparatus (hereinafter referred to as a controller).

In the controller, a host device 47 and an optical disk driver unit 43 are connected via a host interface 41 and a drive interface 45.

Figure 11:
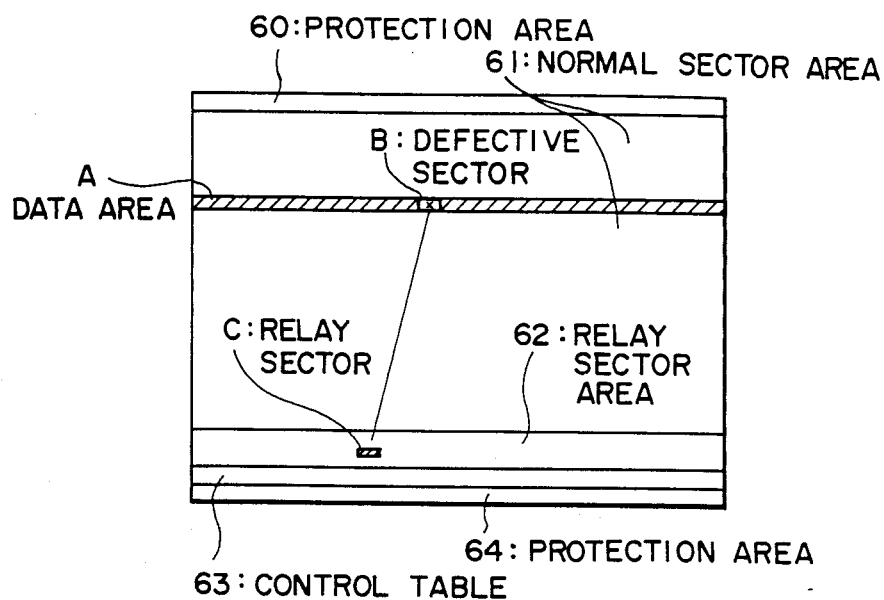
FIG. 11 is a memory map of an optical disk memory.

FIG. 11 is an ordinary memory map used in the optical disk. The memory map is composed of a protection area 60, normal sector area 61, relay sector area 62, control table 63 and protection area 64.

The control table 63 is an area for recording control information such as defective sector information of an optical disk and relay sector information. The control information recorded on the control table 63 is reproduced by setting the optical disk at the driver unit 43, and the reproduced data is stored in a memory 92.

Figure 12:
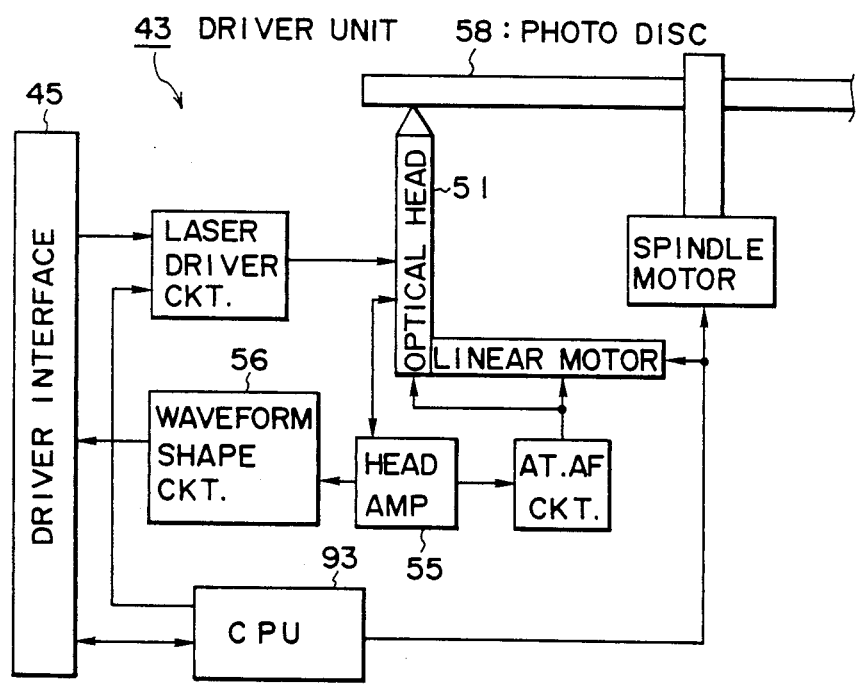
FIG. 12 is a block diagram showing a driver unit of an optical disk apparatus.

FIG. 12 is a block diagram of the driver unit of the information reproducing apparatus.

Figure 13:
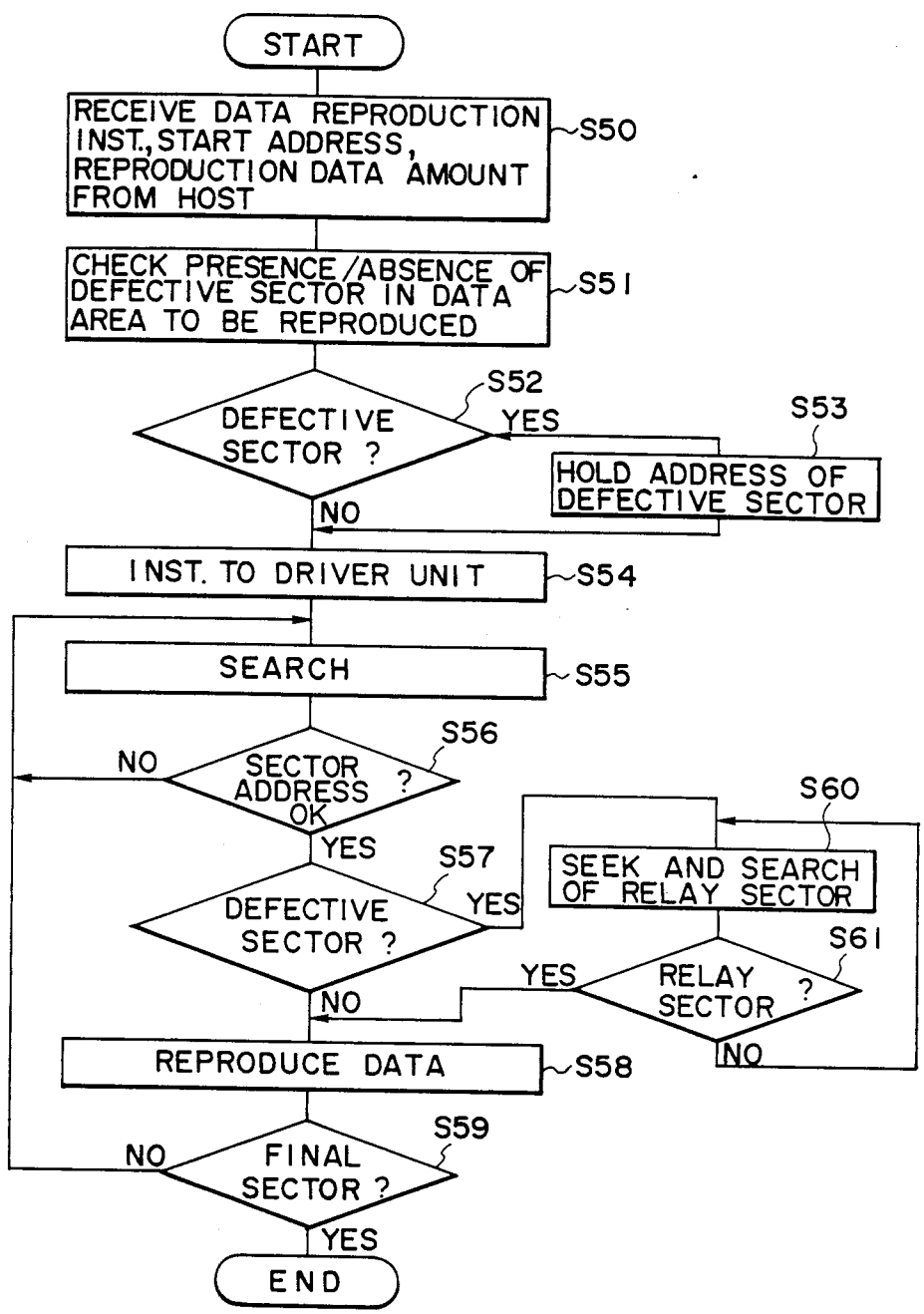
FIG. 13 is a flow chart illustrating the operation of the apparatus of FIG. 10.

Next, the operation of the embodiment will be described. FIG. 13 is a flow chart illustrating the operation of the embodiment.

First, when CPU 93 receives, from the host device 47 via the host interface 41, data reproduction instruction, start address of reproduced data, and reproduction data amount (step S50), CPU 93 checks if there is a defective sector in the data area to be reproduced, based on the control information stored in the memory 92 (step S51). If a defective sector is present in the reproduction area (step S52), CPU 93 instructs to hold the defective sector information (step S53).

After CPU 93 holds the address of the defective sector, it instructs the driver units 43 to move the optical head to search a proper sector, read the sector address from the header, and so on (step S54). The sector address is reproduced and discriminated by an address reproduction circuit 91 and a sector read-received decision circuit 90 (step S25). If the reproduced address corresponds to the sector concerned (step S56), the data recorded on the sector is reproduced.

If there is an error in the reproduced data, i.e., if the data is reproduced from a defective sector (step S57), a relay sector is searched based on the above-held defective sector information (steps S60 and S61) to accordingly reproduce the correct data from a searched relay sector (steps S58 and S59).

The memory map of FIG. 11 also shows a data area A for reproduction data, defective sector B and relay sector C for use with the defective sector B. During the operations of data reproduction, in order to reproduce the data recorded on the relay sector C, it is necessary that the optical head 51 be accessed to the relay sector C from the defective sector B and that after data reproduction by the relay sector C, data reproduction must continue by again making the optical head 51 access to the data area A.

Thus, during the operations of data reproduction, it is necessary that every time the optical head 51 is accessed to the defective sector B, it is accessed to the relay sector C and returned to the original position. As a result, if a plurality of defective sectors B are present in the reproduction data area A, the optical head 51 must be accessed to the relay sector C as many times as the number of defective sectors. Thus, it is understood that data reproduction speed is reduced.

Another embodiment realized by further developing the above embodiment will be described.

Figure 14:
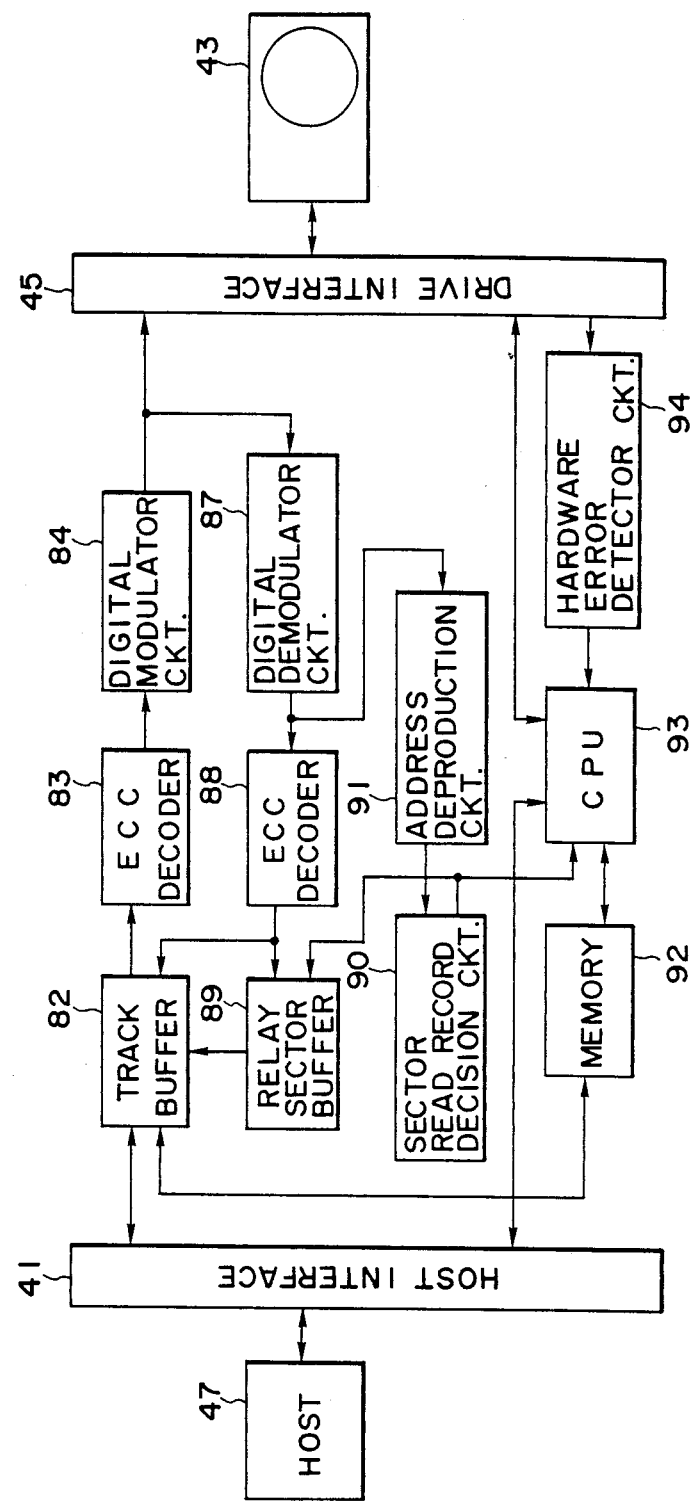
FIG. 14 is a block diagram showing another embodiment of a controller according to the present invention.

FIG. 14 is a block diagram showing the embodiment of the controller according to the present invention, wherein identical elements to those shown in the embodiment of FIG. 10 are designated using the same reference numerals and the description therefore is omitted. The optical disk and driver unit shown in FIG. 13 and the memory map shown in FIG. 12 are also used in this embodiment.

In FIG. 14, there is equipped a track buffer 82, ECC encoder 83, digital modulator circuit 84, digital demodulator circuit 87, ECC decoder 88, sector read record decision circuit 90, address reproduction circuit 91, memory 92, CPU 93, hardware error detector circuit 94, and in addition relay sector buffer 89.

The relay sector buffer 89 stores information recorded on the relay sector area 62 (i.e., relay sector B) shown in FIG. 11.

If there is a defective sector B in the optical disk 58, information is reproduced from the relay sector C corresponding to the defective sector B to store it in the relay sector buffer 89 prior to information reproduction by the optical disk. During reproduction of the information recorded on the optical disk 58, if the optical head 51 is accessed to the defective sector B, the relay sector C is not accessed but the information corresponding to the relay sector C is read from the relay sector buffer 89.

Figure 15:
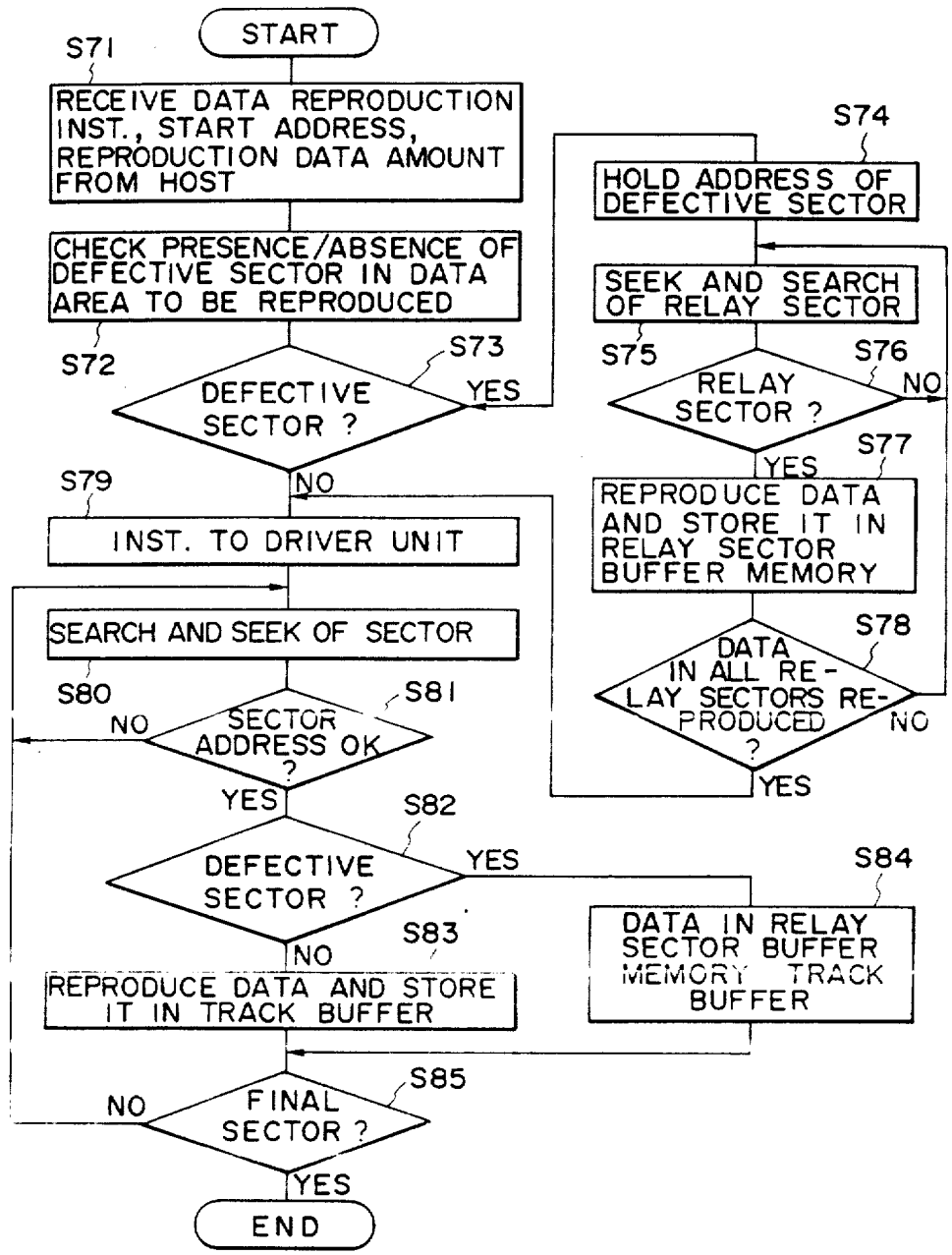
FIG. 15 is a flow chart illustrating the operation of the embodiment of FIG. 14.

Next, the operation of the embodiment will be described. FIG. 15 is a flow chart illustrating the operation of the embodiment.

First, when an optical disk 58 is loaded on the disk apparatus, CPU 93 instructs to store the relay sector control information recorded on the control table 63 of the optical disk 58 into the memory 92. The relay sector control information is then stored in the memory 92 by way of the head amplifier 55, waveform shape circuit 56, drive interface 45, digital demodulator circuit 87, ECC decoder 88 and track number buffer 82.

In case of reproducing the information on the data area A recorded on the normal sector area 61 of the optical disk 58, information regarding the start address (sector address) of the data area to be reproduced and the data amount are transferred from a host device 47 via the host interface 41 (step S71).

Based on the information transferred from the host device 47 and the relay sector control information stored in the memory 92, CPU 93 checks if there is a defective sector B in the data area A to be reproduced shown in FIG. 11 (step S72). If there is no defective sector B in the data area A (step S73), then CPU 93 instructs to reproduce data from the data area A.

If there is a defective sector B in the data area A, CPU 93 picks up and holds all sector numbers of defective sectors B in the data area A (step S74), makes the optical head 51 access to the relay sector area 62 (step S75) to reproduce the data recorded on the relay sector C corresponding to the defective sector and store the data in the relay sector buffer memory 89 (steps S76 and S77).

After data in the delay sectors corresponding to all the defective sectors present in the data area A is stored in the relay buffer memory 89 (step S78), the optical head 51 is accessed to the data area A at the data reproduction start address to start data reproduction (steps S79, S80, S81).

During this data reproduction, when CPU 93 detects that the optical head 51 is located above the defective sector B (step S82), it instructs to transfer data stored in the relay sector buffer memory and corresponding to the defective sector B to the track buffer 82 (step S84). During the reproduction of data other than that of the defective sector, however, the reproduced data is directly stored in the track buffer (step S83). As above, data is reproduced up to the last sector designated from the host device 47 (step S85).

As seen from the above embodiment, it is not necessary to make the optical head 51 access to the relay sector area 62 when the optical head 51 is accessed to a defective sector B during reproduction of the data area A. Instead, data stored in the relay sector buffer memory 89 is transferred to the track buffer, so that data transfer can be performed at high speed. Thus, even though are a number of defective sectors, there is no fear of reducing data reproduction transfer speed.

In other words, the optical head 51 is not required to be accessed to the relay sector area 62 when it accessed a defective sector during data reproduction, to thereby enable reducing data transfer time.

In the above embodiments, information reproduction for sectors has been described. However, the above embodiments are applicable to information reproduction for tracks. In particular, the relay sector buffer in FIG. 14 is replaced with the relay track buffer, and the relay sector area 62 of FIG. 11 is considered as a relay track area.

The present invention is not limited to the abovedescribed embodiments, but various alterations are possible without departing from the scope of the appended claims.

What is claimed is:

1. An information recording apparatus comprising:
an information recording medium comprising a plurality of recording areas, wherein said recording areas including a plurality of information recording areas and an alternative recording area for recording information thereon when said information cannot be recorded on said plurality of information recording areas,
recording means for recording information on said recording areas;
detecting means for detecting whether or not an error exists in said information recorded on said recording area;

control means for directing said information to be recorded on said alternative recording area when said detecting means detects an error; and memory means for storing said information to be recorded on said alternative recording area, wherein said control means controls said recording means such that after said recording means has recorded consecutive information on said information recording area, said control means reads out information stored in said memory means and directs said information to be recorded on said alternative recording area.

2. An information recording apparatus according to claim 1, further including second memory means for storing information indicating a position of said information recording area in which said detecting means detects an error.

3. An information recording apparatus according to claim 2, wherein said recording medium includes a management area for recording data thereon for managing information recorded in said recording medium, and said control means reads out position information stored in said second memory means to direct said recording means to record said position information into said management area.

4. An information recording apparatus according to claim 1, further comprising reading means for reading out information recorded in said recording area wherein said detecting means detects an error in response to an output of said reading means.

5. An information recording apparatus according to claim 1, wherein said recording medium includes a plurality of tracks as recording area.

6. An information recording apparatus according to claim 5, wherein said tracks include a plurality of sectors as recording areas.

7. An information recording apparatus according to claim 1, wherein said memory means is capable of storing a plurality of information to be recorded in said alternative recording area.

8. An information recording apparatus according to claim 1, wherein said recording means is movable on said recording medium.

9. An information reproducing apparatus comprising:

an information recording medium comprising a plurality of recording areas, wherein said recording areas include a plurality of information recording areas, an alternative recording area on which information is recorded instead of said information recording area when said information cannot be recorded on said plurality of said information recording areas, and a management area in which position information indicative of a position of a faulty information recording area in which information cannot be recorded is recorded;

reading means for reading out information stored in said recording areas;

memory means for storing information recorded in said alternative recording area; and control means for causing said information recorded in said alternative recording area to be stored in said memory on the basis of said information on said management area, prior to reading information recorded in said information recording area, and causing information stored in said memory to be read without reading information recorded in said alternative recording area during operation of reading information stored in said recording areas.

10. An information reproducing apparatus according to claim 9, further including second memory means for storing said position information recorded in said management area, wherein said control means reads information recorded in said alternative recording area in response to said position information.

11. An information recording apparatus according to claim 9, wherein said detecting means detects said faulty information recording area in response to said position information.

12. An information recording apparatus according to claim 9, wherein said recording medium includes a plurality of tracks as recording areas.

13. An information recording apparatus according to claim 12, wherein said tracks include a plurality of sectors as recording areas.

14. An information recording apparatus according to claim 9, wherein said reading means is movable on said recording medium.

* * * * *

UNITED STATES PATENT AND TRADEMARK OFFICE
CERTIFICATE OF CORRECTION

PATENT NO. : 4,849,956

DATED : July 18, 1989

INVENTOR(S) : Takayuki Aizawa

It is certified that error appears in the above-identified patent and that said Letters Patent is hereby corrected as shown below:

Fig. 15, of the drawing should be added as shown on the attached sheet.

On the title page item [56]

"Drexlex et al." should read --Drexler et al.--.

COLUMN 1

Line 17, "format of." should read --format of one of the tracks.--.

COLUMN 2

Line 51, "information." should read --information,--.

COLUMN 4

Line 21, "memory" should read --memory 6--.

COLUMN 6

Line 8, "table 304" should read --table 30-4--.

UNITED STATES PATENT AND TRADEMARK OFFICE
CERTIFICATE OF CORRECTION

PATENT NO. : 4,849,956
DATED : July 18, 1989
INVENTOR(S) : Takayuki Aizawa

Page 3 of 3

It is certified that error appears in the above-identified patent and that said Letters Patent is hereby corrected as shown below:

COLUMN 8

Line 40, "it accessed" should read --it accesses--.
Line 50, "abovede" should read --above-de- --.
Line 58, "including" should read --include--.
Line 63, "areas," should read --areas;--.

COLUMN 9

Line 35, "recording area." should red --recording areas.--.

Signed and Sealed this

Nineteenth Day of June, 1990

Attest:

HARRY F. MANBECK, JR.

*Attesting Officer*      *Commissioner of Patents and Trademarks*